(12) United States Patent
Hamilton et al.

(10) Patent No.: US 10,018,852 B2
(45) Date of Patent: Jul. 10, 2018

(54) EYEGLASS POSITIONING DEVICE

(71) Applicant: Visualign LLC, Lubbock, TX (US)

(72) Inventors: James D. Hamilton, Lubbock, TX (US); Lonnie F. Gary, Lubbock, TX (US); Stephen L. Fillipp, Lubbock, TX (US)

(73) Assignee: Visualign, LLC, Lubbock, TX (US)

( * ) Notice: Subject to any disclaimer, the term of this patent is extended or adjusted under 35 U.S.C. 154(b) by 510 days.

(21) Appl. No.: 14/704,141

(22) Filed: May 5, 2015

(65) Prior Publication Data

US 2015/0362745 A1   Dec. 17, 2015

Related U.S. Application Data

(60) Provisional application No. 62/011,952, filed on Jun. 13, 2014.

(51) Int. Cl.
*G02C 5/12* (2006.01)
*G02C 5/00* (2006.01)

(52) U.S. Cl.
CPC .............. *G02C 5/124* (2013.01); *G02C 5/126* (2013.01); *G02C 5/00* (2013.01); *G02C 5/122* (2013.01); *G02C 5/128* (2013.01)

(58) Field of Classification Search
CPC .......... G02C 5/12; G02C 5/122; G02C 5/124; G02C 5/126; G02C 5/00; G02C 5/128
See application file for complete search history.

(56) References Cited

U.S. PATENT DOCUMENTS

| | | |
|---|---|---|
| 164,582 A | 1/1875 | Miller |
| 1,436,313 A | 11/1922 | Hafer |
| 2,041,975 A | 5/1936 | Soden |
| 2,459,051 A | 1/1949 | Smith |
| 2,612,076 A | 9/1952 | Dietz |
| 2,801,569 A | 8/1957 | Ralph |
| 2,881,661 A | 4/1959 | Laisne |
| 3,087,383 A | 4/1963 | Ralph |
| 3,189,913 A | 6/1965 | Hoffmaster |
| 4,113,365 A | 12/1978 | Koketsu |

(Continued)

FOREIGN PATENT DOCUMENTS

| CN | 202512307 | 10/2012 |
|---|---|---|
| GB | 2267358 | 12/1993 |

*Primary Examiner* — Ricky Mack
*Assistant Examiner* — Daniele Manikeu
(74) *Attorney, Agent, or Firm* — Ross Barnes LLP; Robin L. Barnes

(57) ABSTRACT

An eyeglass positioning device configured to be positioned between a user's nose and eyeglasses frame to elevate multifocal lenses relative to a user's eyes to bring an intermediate or near field of vision into a line of sight for use with certain activities, such as computer use, when the user's head is in an upright and normal head tilt position. The eyeglass positioning device preferably comprises a connector and two support arms that simply sit on a user's nose in either an upright or an inverted orientation, providing greater flexibility of use and comfort. The eyeglass positioning device may be used with a variety of shapes, styles, and sizes or eyeglass frames without requiring attachment to the frames or obstructing the field of view through the lenses. The eyeglass positioning device may include a visual or tactile indicator to aid in placing the device on a user's nose.

44 Claims, 10 Drawing Sheets

(56) References Cited

U.S. PATENT DOCUMENTS

| | | | | |
|---|---|---|---|---|
| 4,131,341 | A | 12/1978 | Bradley, Jr. | |
| 4,252,422 | A | 2/1981 | Speckhart | |
| 4,289,386 | A | 9/1981 | Brandstetter | |
| 4,674,133 | A | 6/1987 | Oschner | |
| 4,787,729 | A | 11/1988 | Ruffen | |
| 4,802,754 | A | 2/1989 | Reef | |
| 4,902,119 | A * | 2/1990 | Porsche | G02C 5/122 351/136 |
| 4,925,292 | A | 5/1990 | Negishi | |
| 4,950,066 | A | 8/1990 | Hartman | |
| 4,964,716 | A | 10/1990 | Combs | |
| 5,004,334 | A | 4/1991 | Miele | |
| 5,412,438 | A * | 5/1995 | Bolle' | G02C 5/126 351/138 |
| 5,533,503 | A | 7/1996 | Doubek et al. | |
| 5,680,193 | A | 10/1997 | Epstein | |
| 5,682,607 | A | 11/1997 | Klein | |
| 5,711,026 | A | 1/1998 | Kaltman et al. | |
| 5,769,089 | A | 6/1998 | Hand et al. | |
| 5,790,230 | A * | 8/1998 | Sved | A61F 9/025 351/110 |
| 5,828,438 | A * | 10/1998 | Kuo-Tseng | G02C 5/12 351/136 |
| 5,885,675 | A | 3/1999 | Martin | |
| 5,907,385 | A | 5/1999 | Flores et al. | |
| 5,971,538 | A | 10/1999 | Heffner | |
| 6,056,398 | A | 5/2000 | Negishi | |
| 6,212,020 | B1 | 4/2001 | Ahlgren et al. | |
| 6,439,718 | B1 | 8/2002 | Miceli et al. | |
| 6,520,636 | B2 | 2/2003 | Saitoh et al. | |
| 6,554,422 | B2 | 4/2003 | Bell | |
| D502,205 | S | 2/2005 | Bullard, Jr. | |
| 7,117,543 | B1 | 10/2006 | Gunnarshaug | |
| D565,634 | S | 4/2008 | Bullard, Jr. | |
| 7,425,065 | B2 * | 9/2008 | Wang | G02C 5/122 351/137 |
| 7,591,555 | B1 | 9/2009 | Chen | |
| 8,051,850 | B2 | 11/2011 | Kwok | |
| D651,641 | S | 1/2012 | Fulton | |
| 8,136,941 | B2 | 3/2012 | Slicker | |
| 8,235,045 | B2 | 8/2012 | Moore | |
| D676,897 | S | 2/2013 | Seo et al. | |
| 8,555,413 | B2 | 10/2013 | Beliveau | |
| 2001/0055093 | A1 | 12/2001 | Saitoh et al. | |
| 2003/0123022 | A1 | 7/2003 | Mulvey | |
| 2005/0052614 | A1 | 3/2005 | Negishi et al. | |
| 2010/0263247 | A1 | 10/2010 | Liguori | |
| 2014/0354941 | A1 | 12/2014 | Chang | |
| 2015/0049298 | A1 * | 2/2015 | Chen | G02C 5/122 351/137 |

\* cited by examiner

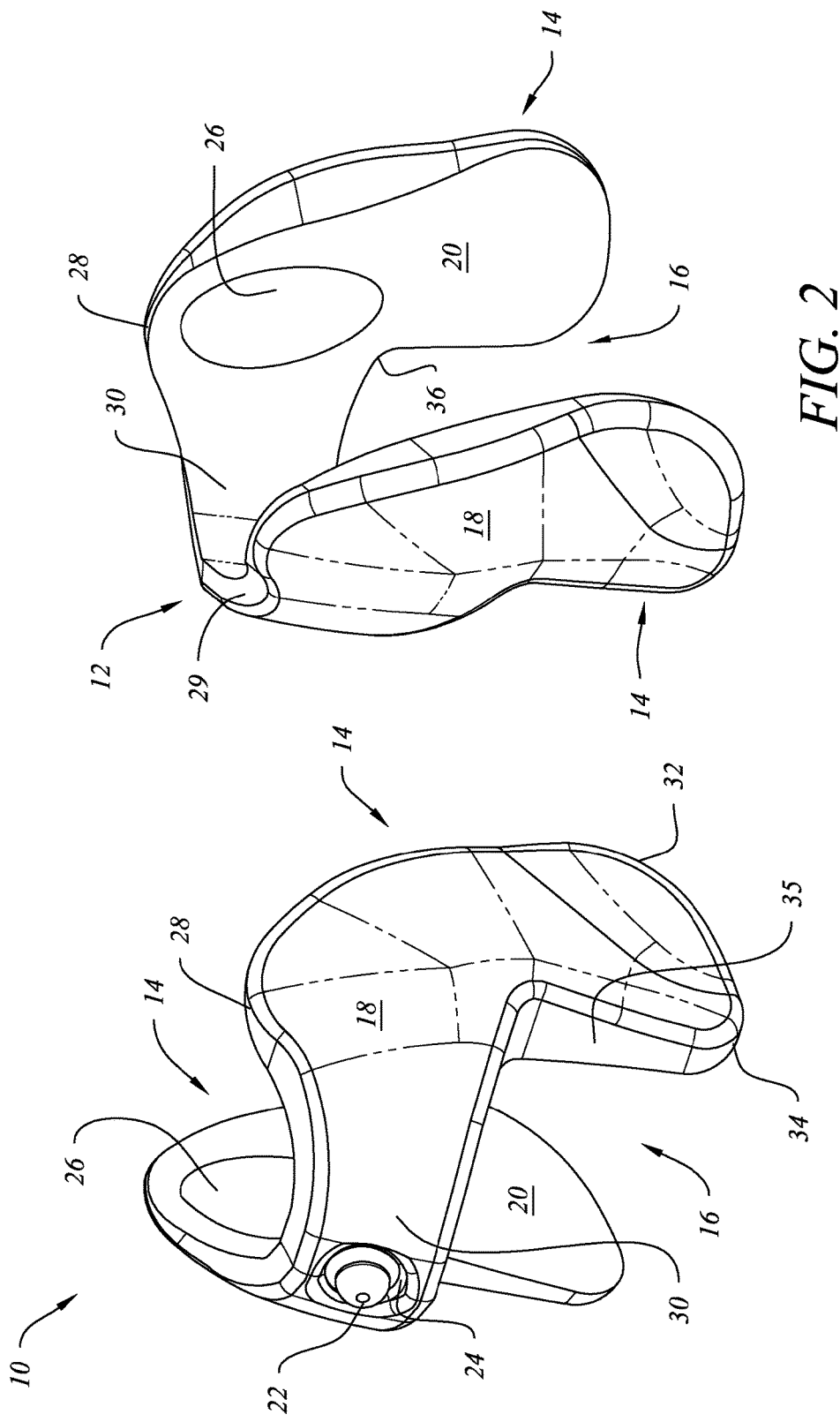

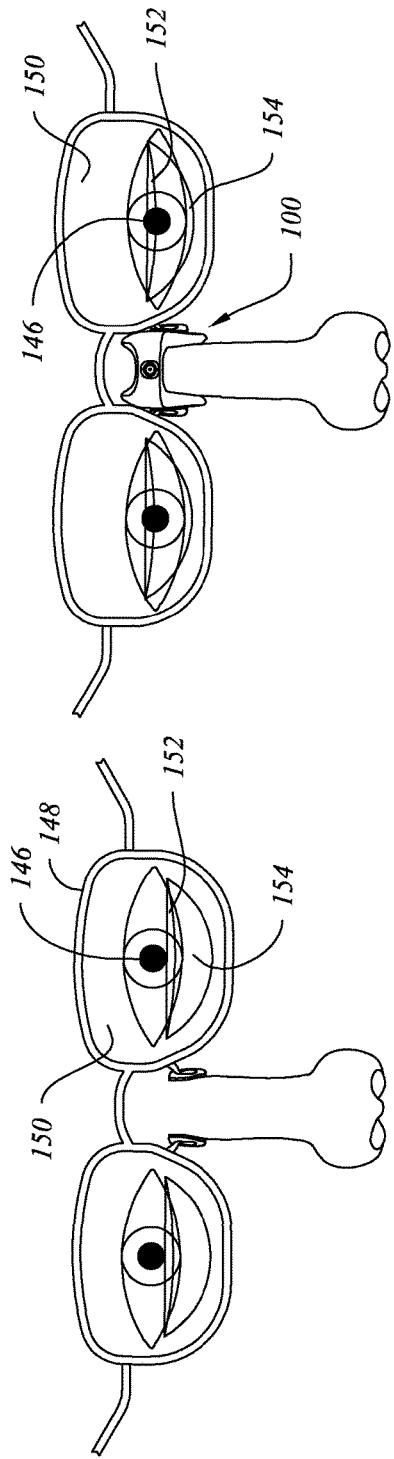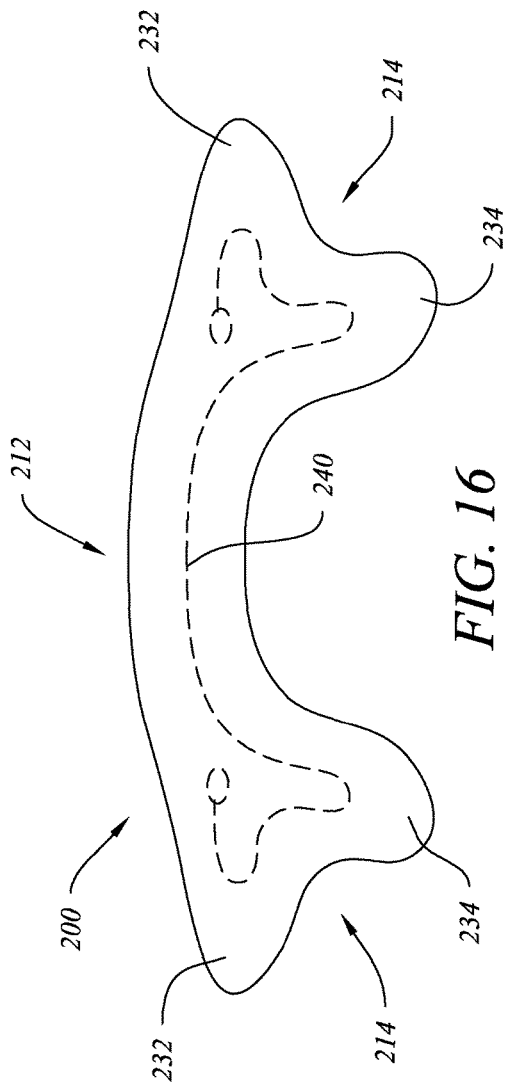
FIG. 15A
FIG. 15B
FIG. 16

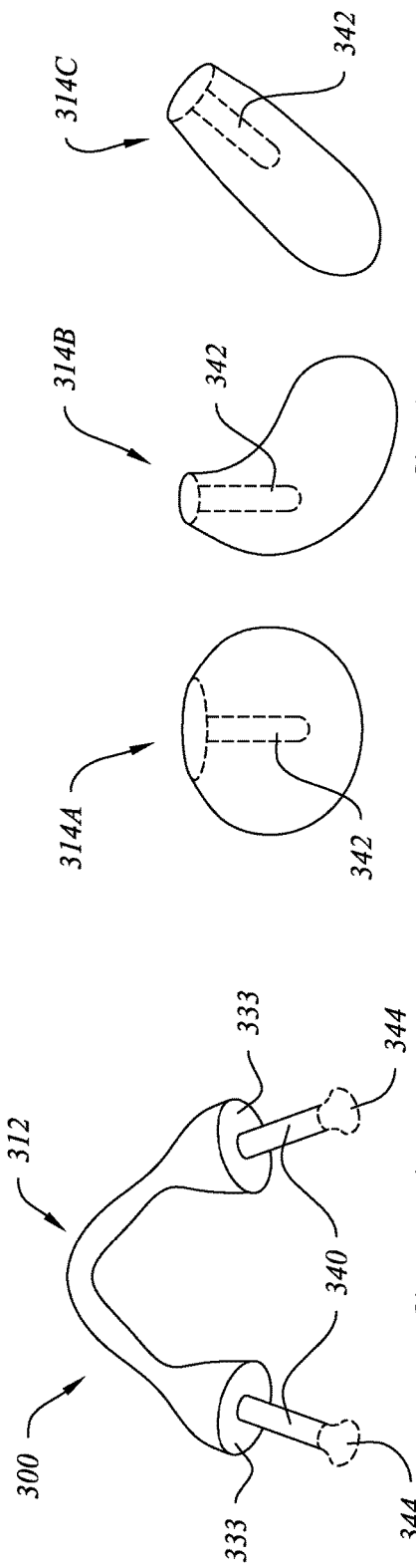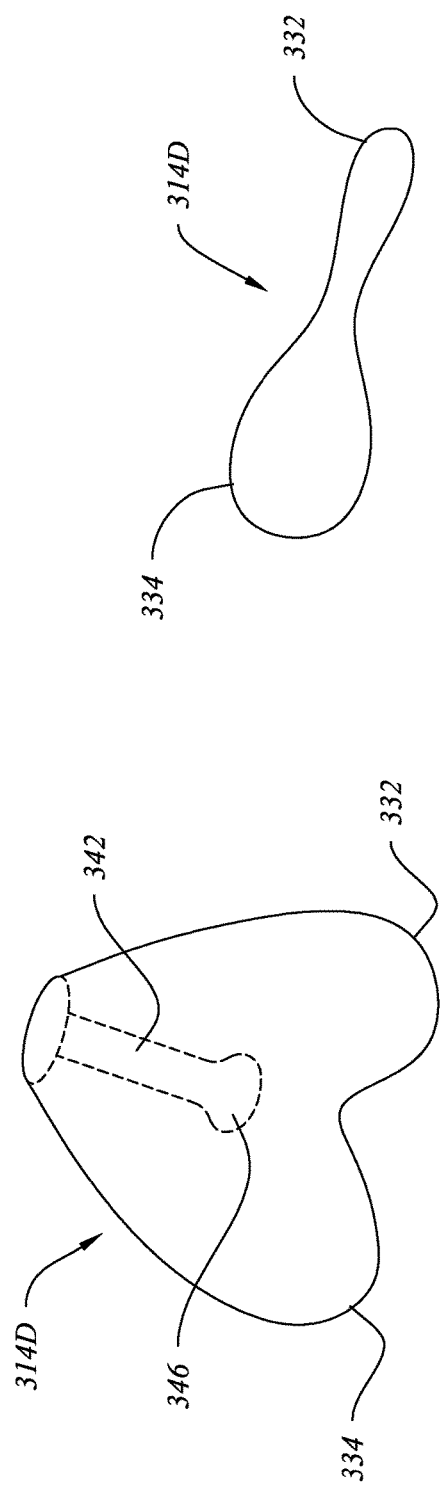

EYEGLASS POSITIONING DEVICE

CROSS-REFERENCE TO RELATED APPLICATION

This application claims the benefit of U.S. Provisional Application Ser. No. 62/011,952 filed on Jun. 13, 2014.

BACKGROUND OF THE INVENTION

1. Field of the Invention

This invention relates to device to temporarily elevate the position of eyeglasses having multifocal lenses relative to a user's eyes for proper visual and head alignment for certain activities, such as computer use.

2. Description of Related Art

Multifocal eyeglasses have been used for many years to provide different focal points to correct a user's vision for different activities, such as close-up reading or viewing a movie at a distance. These types of eyeglasses include bifocals, trifocals, and progressive no-line lenses. For certain activities, a user must adjust his or her head position to bring the portion of the glasses having the required focal point into the line of vision for the activity. This can cause neck and shoulder discomfort and headaches.

One particular activity that is problematic is use of a computer. Viewing a computer screen typically requires the intermediate or near focal region of one's eyeglasses. However, the computer monitor is typically positioned such that most of the screen is viewed through the distance focal area of the glasses, with the intermediate or near focal zones of the glasses being too low, when the user's head is held in a normal position (see FIG. 12 A, for example). Computer users frequently tilt their heads back, away from the computer screen, in order to elevate the near or intermediate focal area and bring it into alignment with the screen (see FIG. 12B, for example). The angle of tilt, which can be 10 to 30 degrees from a normal or natural head tilt position for computer usage, can result in pain and discomfort, particularly for prolonged periods of computer use. Similar issues arise when using portable electronic devices, piano music, art easels and the like.

There are many known devices that are specifically designed for elevating multifocal eyeglasses on a user's face. For example, U.S. Pat. No. 2,144,165 discloses bifocal frames having rotatable nose pads configured to elevate the position of the glasses in one position and lower them when rotated 180°. The supporting member for the rotatable nose pads is fixed to the eyeglasses frame, so it is not useful as a retrofit device for existing glasses. Additionally, the moving parts increase the likelihood of failure from wear and use. Similarly, U.S. Pat. No. 6,554,422 discloses several adjustable nose rest devices that allow the eyeglass frame to slide up and be held in place by a set screw. The devices in the '422 patent involve several parts capable of moving relative to other parts to position the device and secure it in place during use, increasing the likelihood of failure. Additionally, many of the devices disclosed in the '422 patent are only for use with specially designed eyeglass frames, while others are limited to eyeglass frames having a certain frame dimensions, such as thickness, and cannot be used with standard eyeglass frames without modifying the frame.

Another example is U.S. Pat. No. 3,712,717, which discloses a pad device that sits on the user's nose behind the bridge of the eyeglasses frame and includes a hook that attaches to the bridge of the frame. The device in the '717 patent pushes the eyeglasses frame forward relative to the user's face, which may displace the temple tips that curve behind the ear resulting in discomfort. The forward displacement of the frame may also diminish the area of corrected vision as the lenses move further from the eyes, depending on the frame/lens size/shape. Additionally, the hook portion of the device in the '717 patent limits use of the device to eyeglasses frames of particular sizes and shapes. Similarly, the devices disclosed in U.S. Pat. Nos. 2,801,569 and 3,087,383 have a slot into which the bridge of the eyeglasses frame is inserted, pushing the eyeglasses forward and limiting use to eyeglasses frames of particular sizes and shapes. The devices in these patents also have side flange parts that attach to the lower end of the eyeglasses frame, which further limits use of the devices to particular types and sizes of frames and may partially obstruct the view through the lenses.

The known prior art devices suffer from several drawbacks. These include that they are mechanically complicated, are useable with only certain types or sizes of eyeglass frames, push the eyeglasses forward relative to the user's face, partially obstruct the lenses, are not easily positioned relative to the user's face and eyeglasses frame, and are not discrete in appearance. There is a need for a simple universal device that is easily positioned and used with varying styles and sizes of eyeglass frames.

SUMMARY OF THE INVENTION

This invention provides a simple, universal eyeglass positioning device that may be used with many different types, styles, and sizes of multifocal eyeglass frames. It is easy to position relative to the user's face and the eyeglass frame, easy to remove when use is not needed, and is unobtrusive and discrete when in use. According to one preferred embodiment, an eyeglass positioning device comprises a generally U-shaped connector with support arms extending from each end of the connector. The eyeglass positioning device simply sits on the user's nose. The frame of the multifocal eyeglasses rests on some part of the eyeglass positioning device, which may vary depending on the frame style and size, allowing the device to be used with a variety of different eyeglasses and not requiring any specialized or modified frames. The thickness of the eyeglass positioning devices elevates the eyeglasses relative to the user's face to elevate the focal regions disposed at the mid-to-bottom region of the lenses into a line of sight with a natural head position for computer use.

According to another preferred embodiment, an eyeglass positioning device is capable of securely supporting an eyeglass frame without requiring any portion of the positioning device to attach or hook onto the frame. The exterior surface of the positioning device is preferably made of materials that are slip-resistant and that frictionally engage the eyeglasses frame or the nose pads of the eyeglasses to hold them in place. The interior surfaces of the positioning device are also preferably made of slip-resistant materials to keep the device from slipping on the user's nose.

According to another preferred embodiment, an eyeglass positioning device comprises a substantially U-shaped connector and two support arms that extend in a substantially perpendicular direction from each rearward end of the U-shaped connector. This preferred embodiment is capable of use in two different orientations. In a first orientation, the connector of the eyeglass positioning device sits on or near the bridge of the user's nose (or extends across the top of the user's nose) proximal to the eyes with the support arms extending down the sides of the nose toward the user's mouth (referred to herein as the upright position or orientation). In a second orientation, the connector sits on or near the bridge of the user's nose (or extends across the top of the user's nose) distal from the eyes with the support arms extending up the sides of the nose toward the user's eyes (referred to herein as the inverted position or orientation). The differing orientations provide more flexibility for use of the device with different styles and sizes of eyeglass frames and a user may find one orientation more comfortable than the other. No modification to the device is needed to switch between the first and second orientations; the device is simply placed on the user's face in one of the two orientations and can easily be removed, rotated and repositioned in the other orientation. Generally, the upright orientation is best suited for use with eyeglass frames having nose pads and the inverted orientation is best suited for use with eyeglass frames having no nose pads (saddle bridge). This is because nose pad frames are typically positioned slightly higher relative to the user's eyes than frames with a saddle bridge, so the inverted position aids in ensuring the saddle bridge frames make contact the positioning device. However, the orientation and placement of the frames relative to the positioning device may vary from user to user depending on the specific size and shape of the user's nose and eyeglass frame.

According to another preferred embodiment, an eyeglass positioning comprises support arms have areas of variable thickness. An area proximal to the connector is preferably thicker than an area distal to the connector or vice versa. A transition between a raised or thicker area and a recessed or thinner area may be a smooth, sloping transition or may be a more distinct ridge. The varying thickness allow greater flexibility in the amount of height adjustment for the field of vision depending on whether the positioning device is positioned so the eyeglasses frames contact a thicker area or a thinner area.

According to another preferred embodiment, no portion of the eyeglass positioning device extends behind the eyeglass frame bridge, between the nose/forehead area and the frame bridge. As such, the eyeglass positioning device does not cause the eyeglass frame to be pushed forward relative to the user's face and the temple ends remain in substantially the same horizontal position relative to the user's ears when the positioning device is in use as when it is not in use. This makes use of the device more comfortable for the user and does not result in diminishing the area of corrected sight, which may occur if the lenses are moved forward relative to the user's eyes.

According to another preferred embodiment, an interior surface of each support arm comprises an indentation configured to provide a slight cupping to aid in securely positioning an eyeglass positioning device on the sides of a user's nose. Indentation may aid in frictional engagement or may provide some suction to secure the eyeglass positioning device. According to yet another preferred embodiment, an eyeglass positioning device is made of materials that are substantially transparent or clear or colored in any one of a variety of skin tones to make the positioning device more discreet during use. According to yet another preferred embodiment, an eyeglass positioning device comprises a visual and/or tactile indicator to aid the user in properly aligning the eyeglass positioning device on the user's nose. Having the eyeglass positioning device centered on the nose and in a substantially straight orientation may be difficult to achieve, particularly if discrete coloration is used, without an indicator. If the positioning device is off-centered or slightly twisted on the nose, this may cause one side of the eyeglass frame to be slightly more elevated than the other, which is not desirable.

According to another preferred embodiment, an eyeglass positioning device comprises a connector and two support arms as separate, attachable parts, each of which may be made in a variety of configurations designed for interchangeability to increase the customization of the positioning device for a particular user. The support arms may be fixedly attached to the connector or may rotatable relative to the connector. The support arms may comprise a symmetrical or non-symmetrical shape when viewed from a side elevation. The eyeglass positioning device according to this embodiment is also usable in different orientations. When the support arms are fixedly attached, the upright orientation has the connector located proximal to the eyes with the support arms extending downward toward the mouth. The inverted orientation has the connector distal to the eyes with the support arms extending upward toward the eyes. If the support arms are rotatable relative to the connector and are non-symmetrical, additional orientations may be achieved by rotating the support arms so that a first end of each support arm is proximal to the eyes (an upright orientation) or a second end of each support arm is proximal to the eyes (an inverted position), without requiring a change in the location of the connector.

According to another preferred embodiment, an eyeglass positioning device comprises a plurality of attachable pads that may be used to increase comfort and/or to increase the level of elevation that may be achieved. At least one such pad preferably comprises a non-adhesive, preferably cushioned, side and self-adhesive side, which may be adhered to either the inside the positioning device or the outside of the positioning device in an area where the eyeglass frame contacts the positioning device. Additional pads preferably may have adhesive on one side or on each side. Two or more pads may stacked, as desired.

The preferred embodiments of the eyeglass positioning devices according to the invention are simple, do not require any moving parts for installation or use, are capable of functioning with a variety of face shapes and sizes and can be used with a variety of standard eyeglass frames without requiring any modification of those frames. These preferred embodiments do not push the eyeglasses forward, obstruct the view through the lenses, and are discrete in appearance.

BRIEF DESCRIPTION OF THE DRAWINGS

The eyeglass positioning devices of the invention are further described and explained in relation to the following drawings wherein:

FIG. 1 is front perspective view of a preferred embodiment of an eyeglass positioning device according to the invention;

FIG. 2 is rear perspective view of the eyeglass positioning device of FIG. 1;

FIG. 15A shows a typical position of a representative pair of trifocal lenses relative to a wearer's eye without the use of an eyeglass positioning device according to the invention;

FIG. 15B shows a typical position of a representative pair of trifocal lenses relative to the wearer's eye when a preferred embodiment of an eyeglass positioning device according to the invention is used;

FIG. 16 shows a top plan view of another preferred embodiment of an eyeglass positioning device with adjustably positionable support arms;

FIG. 17A shows a bottom perspective view of another preferred embodiment of connector for an eyeglass positioning device FIG. 17B shows side elevational views of alternate embodiments for support arms for use with the connector of FIG. 17A;

FIG. 18 shows a side elevational view of an alternate embodiment for a support arm for use with an eyeglass positioning device according to the invention;

FIG. 19 shows a front elevational view of the support arm of FIG. 18; and

DESCRIPTION OF THE PREFERRED EMBODIMENTS

Figure 3:
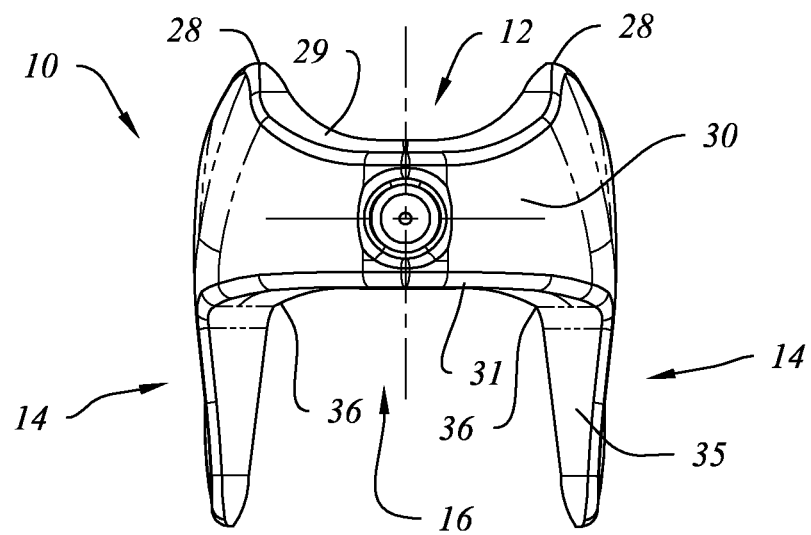
FIG. 3 is a front elevation view of the eyeglass positioning device of FIG. 1.

Referring to FIGS. 1-7, a preferred embodiment of an eyeglass positioning device 10 according to the invention is shown. In this embodiment, eyeglass positioning device 10 preferably comprises a generally U-shaped connector 12 and two support arms 14 (a right arm and a left arm) extending in a substantially perpendicular direction from each rearward end 33 of the U-shaped connector 12. Connector 12 and support arms 14 are preferably unitarily molded as a single body comprising an outer or exterior surface 18, a portion of which would contact an eyeglass frame in use, and an inner or interior surface 20, at least of portion of which contacts the user's nose when in use. An open area 16, into which a user's nose is placed, is formed on the interior surface side of positioning device 10 between connector 12 and support arms 14. Dashed lines on FIGS. 1-7 show contour or curvature on exterior surface 18.

Figure 10:
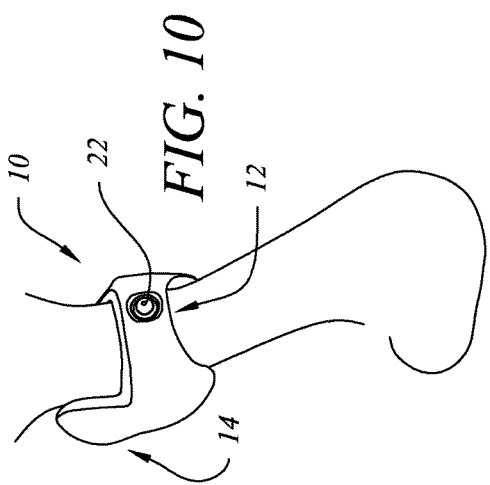
FIG. 10 is a perspective view of a preferred embodiment of an eyeglass positioning device according to the invention in place on a user's nose in an inverted orientation.

Connector 12 preferably comprises a central portion 30 that forms a rounded part of the U-shape which extends outwardly towards ends 33 of the U-shape (best seen in FIG. 6), and a top face 29 and a bottom face 31. When eyeglass positioning device 10 is in an upright position (as shown in FIGS. 1-4), top face 29 is an upper facing surface nearest the user's forehead and bottom face 31 is a lower facing surface nearest the user's mouth. In an inverted position (as shown in FIG. 10), top face 29 would be a lower facing surface nearest the user's mouth and bottom face 31 would be an upper facing surface nearest the user's forehead.

Figure 4A:
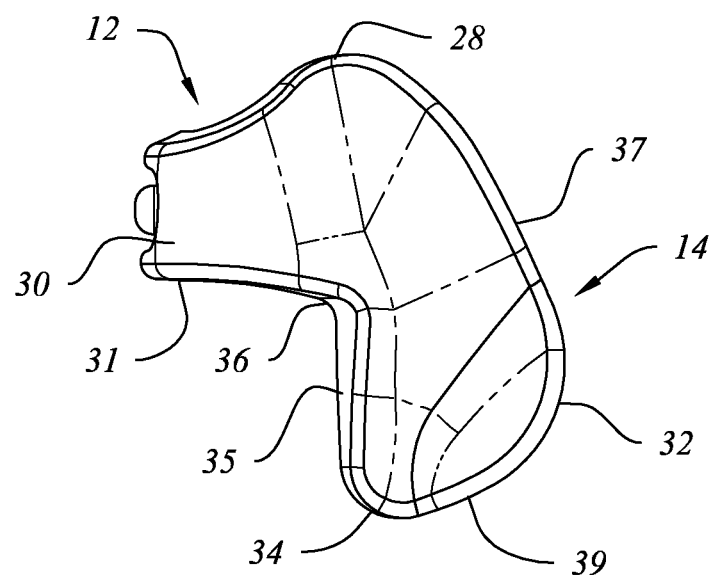
FIG. 4A is a side elevation view of the eyeglass positioning device of FIG. 1.
Figure 4B:
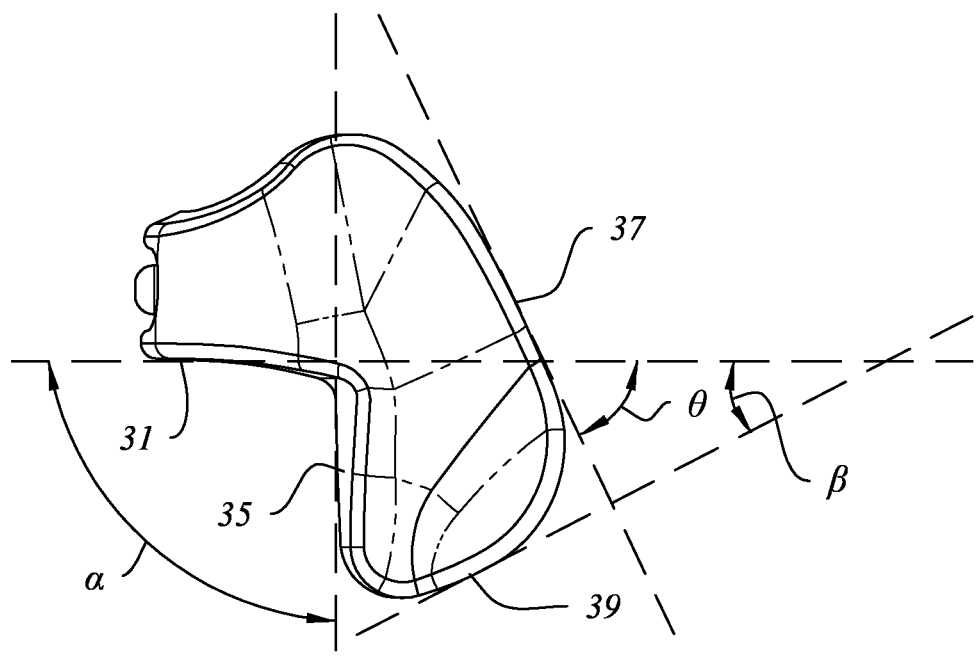
FIG. 4B is a side elevation view of the eyeglass positioning device of FIG. 1 showing angles of various parts.

A support arm 14 extends from each end 33. Most preferably, each support arm 14 forms a wedge or triangular shape with rounded corners when viewed from a side elevation (FIG. 4). Each support arm 14 preferably comprises a forward face 35, a rearward face 37, a connecting face 39, and rounded portions 28, 32, and 34. A rounded junction 36 is disposed between bottom face 31 of connector 12 and forward face 35 for each support arm. Top face 29 of connector 12 preferably slopes from central portion 30 out toward each end 33 to create a smooth transition between top face 29 and rounded portion 28 of each arm 14. As shown in FIG. 4B, each forward face 35 is preferably substantially perpendicular to bottom face 31. Most preferably, each forward face 35 is disposed at an angle α between 85° to 95° degrees relative to bottom face 31, but may be disposed at an angle α between 45° and 135° relative to bottom face 31. Rearward face 37 is most preferably disposed at an angle θ of around 55 to 65° relative to bottom face 31. Other angles θ of around 50 to 70° may also be used, depending on the angle α of forward face 35 relative to bottom face 31. Connecting face 39 is most preferably at an angle β of around 30 to 45° relative to bottom face 31. Other angles β of around 30 to 50° may also be used, depending on the angles of α and θ.

Figure 5:
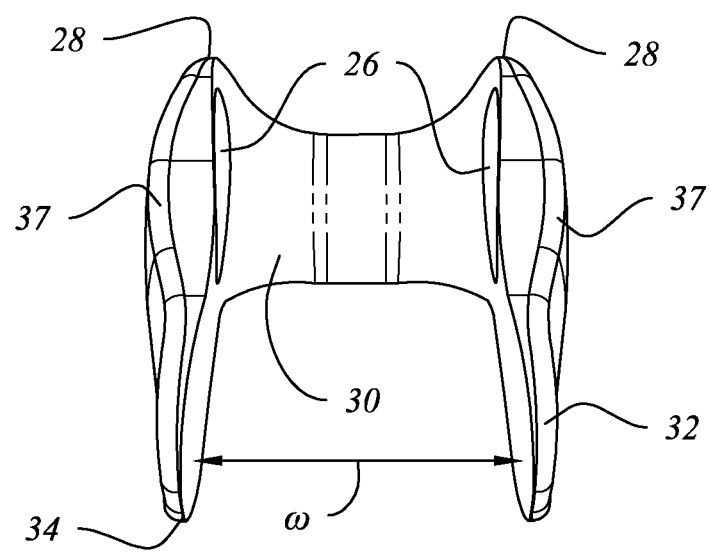
FIG. 5 is a rear elevation view of the eyeglass positioning device of FIG. 1.

Eyeglass positioning device 10 also optionally comprises two indentations or recesses 26 disposed on interior surface 20 (best seen in FIGS. 2 and 5). Most preferably, an indentation 26 is disposed in an area of transition between connector 12 and support arm 14 on each side of eyeglass positioning device, as shown in FIG. 5. These indentations 26 may provide a cupping or slight suction force to aid in securing eyeglass positioning device 10 on a user's nose. Other shapes and orientations for indentations 26 may also be used.

Eyeglass positioning device 10 also optionally comprises one or more tactile and/or visual indicators to aid the user in properly aligning the eyeglass positioning device on the user's nose. Preferably, a recess 24 is disposed on exterior surface 18 and centered on central portion 30 of connector 12. This locates a center of recess 24 along a vertical centerline for eyeglass positioning 10, centering recess 24 across the width of positioning device 10. A center of recess 24 is also preferably positioned along a horizontal centerline, dividing the height of central portion 30 at the vertical centerline. Recess 24 provides tactile and visual cues that a user may see and feel with his or her fingers when placing positioning device 10 on his or her nose. A protrusion 22 may also be disposed within recess 24 to enhance the tactile and visual cues. Protrusion 22 is preferably a dome or semi-spherical shape that is centered within recess 24. In the alternative or in addition to either recess 24 or protrusion 22, one or more colored visual indicators may be provided. For example, a dot or ring colored differently from the rest of exterior surface 18 may be included in, on, or around recess 24 or protrusion 22 to further aid in placement of the positioning device 10 on the user's nose. Having the eyeglass positioning device centered on the nose and in a substantially straight orientation may be difficult to achieve, particularly if discrete coloration is used, without an indicator. If the positioning device is off-centered or slightly twisted on the nose, this may cause one side of the eyeglass frame to be slightly more elevated than the other, which is not desirable.

Figure 6:
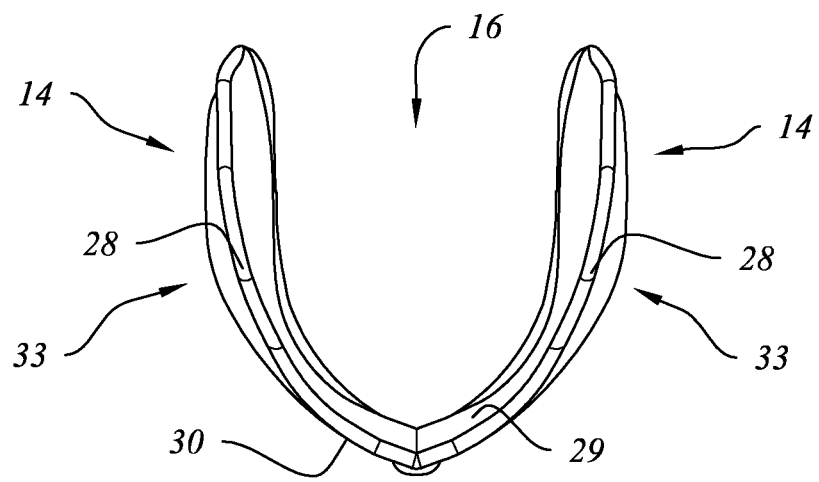
FIG. 6 is a top plan view of the eyeglass positioning device of FIG. 1.
Figure 7:
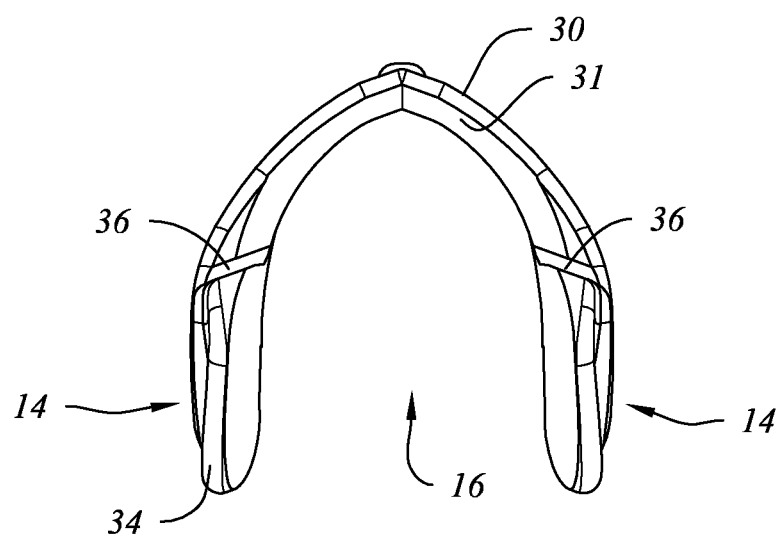
FIG. 7 is a bottom plan view of the eyeglass positioning device of FIG. 1.
Figure 9:
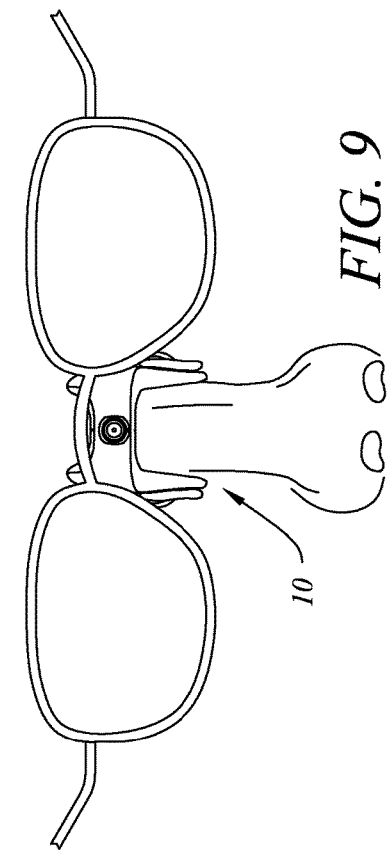
FIG. 9 is front elevation view of the eyeglass positioning device of FIG. 8 shown with an exemplary style of eyeglass frame (having a nose pads)

As shown in FIGS. 3, 5, and 6, each support arm 14 is preferably thickest in an area near forward face 35 and rounded junction 36 and tapers slightly as it extends toward rounded corners 34 and 32. Similarly, connector 12 is preferably thickest near each end 33 and is thinner near central portion 30. The thickness of various parts or locations on eyeglass positioning device 10 may vary to provide increased elevation of eyeglasses frames or to enhance the cushioning benefits of eyeglass positioning device 10. Alternatively, eyeglass positioning device 10 may be of substantially uniform thickness throughout (except for the portion having optional indentation 26, if used). The thickness, or range of thicknesses, for device 10 is preferably between about 1 to 5 mm. Most preferably, the support arms 14 are around 3 to 5 mm thick at an end nearest connector 12 and around 1 to 3 mm thick at an end near corners 34 and 32, with a smooth, tapering transition between the two ends.

The overall size of device 10, or the size of any particular component of device 10, may vary to accommodate different users. For example, device 10 may come in a small size for users with smaller noses, a large size for users with larger noses, etc. The overall height of device 10 from a point near rounded corner 34 to rounded corner 28 (see FIG. 4A) is preferably between 15 and 25 mm and more preferably between 17 and 19 mm. Most preferably, the overall height of device 10 is around 19 mm. A width between rounded corner 34 on one support arm 14 and the other rounded corner 34 on the other support arm 14 (W on FIG. 5) is preferably between 5 and 15 mm and more preferably between 9 and 12 mm. Most preferably, the width is around 11 mm. The height of connector 12 at the centerline (FIG. 3) is preferably between 4 and 10 mm and more preferably between 5 and 7 mm. Most preferably, the height of connector 12 at the centerline is around 6 mm.

Exterior surface 18 of the positioning device 10 is preferably made of materials that are non-irritating, slip-resistant and that frictionally engage the eyeglasses frame or the nose pads of the eyeglasses to hold them in place. The interior surface 20 of the positioning device 10 is also preferably made of slip-resistant materials to keep the device 10 from slipping on the user's nose. Suitable materials include PVC and silicone, but other materials (preferably medical-grade materials that will not irritate a user's skin and are hypoallergenic) may also be used. It is preferred that device 10 be made of materials that are easily washable or rinseable, so that device 10 may be used repeatedly and cleaned as needed. It is preferred that device 10 be unitarily molded, with exterior surface 18 and interior surface 20 being made of the same material, but differing materials may be used with device 10 for exterior surface 18 and interior surface 20. As an alternative, interior surface 20 may have an adhesive surface that is covered by a removable backing prior to use. This adhesive surface may aid in adhering the device 10 to the user's nose. Most preferably the adhesive would be low-tack so that it is easily removed without hurting the user or leaving residue. Positioning devices with this self-sticking adhesive surface would be designed to be used several times before the adhesive loses tackiness, then the entire device could be disposed of and replaced with a new positioning device. These devices are relatively inexpensive to manufacture, so periodic replacement should not be problematic.

Most preferably, device 10 is made from semi-transparent or transparent materials to make the device less visible when in use. Alternatively, device 10 may be made in a variety of colors, particularly various flesh tones that allow device 10 to be discreetly used. If tactile and/or visual cues are used with device 10, they may include one or more colors that are different from the color of the rest of device 10 to allow those indicators to be further visually distinct.

Figure 11:
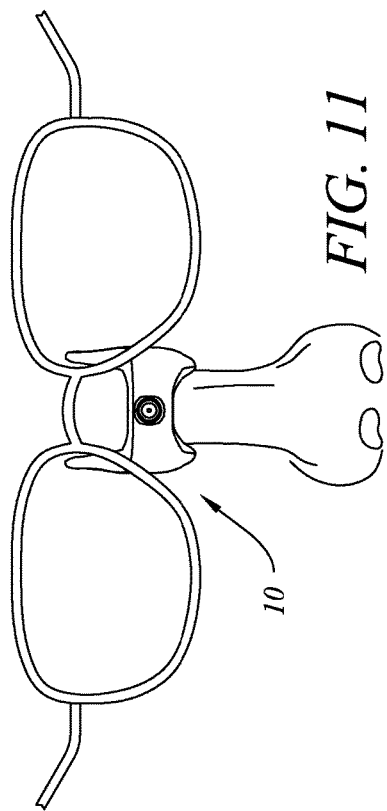
FIG. 11 is a front elevation view of the eyeglass positioning device of FIG. 10 shown with an exemplary style of eyeglass frame (having a saddle bridge)
Figure 8:
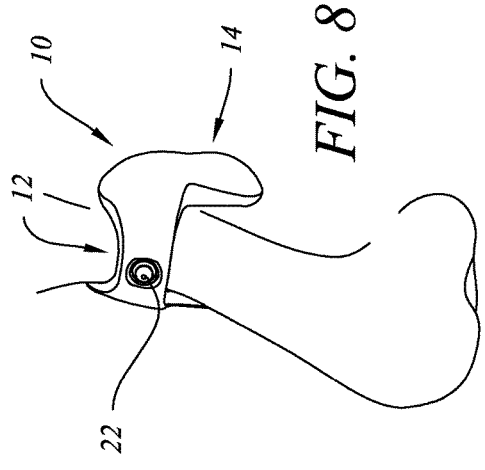
FIG. 8 is a perspective view of a preferred embodiment of an eyeglass positioning device according to the invention in place on a user's nose in an upright orientation.

FIGS. 8-11 show the eyeglass positioning device 10 of FIGS. 1-7 in place on a user's nose and with a representative pair of eyeglasses placed on the positioning device 10. Eyeglass positioning device 10 may be used in either an upright orientation (FIGS. 8 and 9) or an inverted orientation (FIGS. 10 and 11). No alterations or modifications to eyeglass positioning device 10 are needed to allow use in either orientation. The user can simply place the device in one of the two orientations on his or her nose, place the eyeglasses on the positioning device 10 and proceed with computer use, reading, or other activity.

For most users, central portion 30 will contact a top portion of the user's nose, while the support arms 14 will contact the sides of the user's nose (a right support arm on the right side of the nose and a left support arm on the left side of the nose). With certain nose shapes, and depending on the size of device 10 (as device 10 may be provided in several different sizes) and its orientation, it is possible that some or all of central portion 30 may not contact the user's nose, but would be disposed across and slightly above the top or bridge area of the user's nose. Generally, this will not adversely impact use of positioning device 10 since most eyeglass frames will be supported by and contact the support arms 14 or connector 12 further out towards ends 33, rather than near central portion 30. However, if this causes too much frame elevation, the user may select a different size of positioning device 10, or support arms may be adjusted slightly to make them wider (as discussed with respect to device 200 below) so that central portion 30 does contact the top of the nose, or positioning device 10 may be used in the opposite orientation (upright or inverted) which may bring central portion 30 into contact with the nose.

The use of eyeglass positioning device 10 allows a near or intermediate field of vision portion of the eyeglass lenses to be elevated relative to the user's eyes and correspondingly relative to the object (such as a computer screen) on which the user is focusing. For example, FIG. 12 A shows typical field of vision ranges for trifocal (or progressive) lenses, including a distance field 50, intermediate field 52, and near field 54, with the user's head positioned in a normal head tilt position without the use of an eyeglass positioning device according to the invention. As can be seen, the majority of the computer screen 48 falls within the distance 50 field of vision, making it difficult for the user to read the screen 48.

Figure 12A:
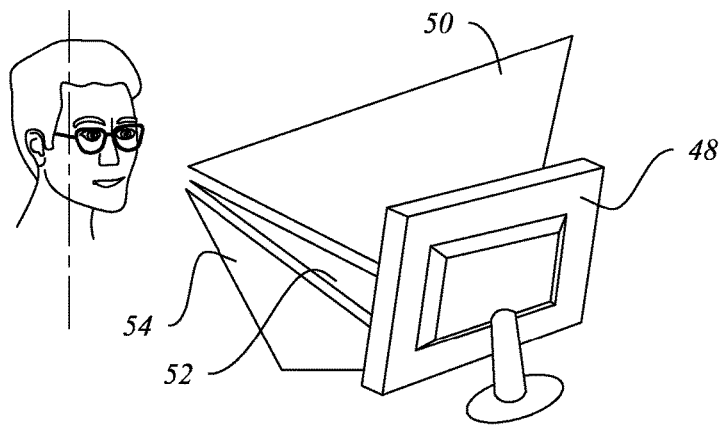
FIG. 12A shows typical field of vision locations for a multifocal eyeglass wearer while sitting at a computer with his head in a natural head position.
Figure 12B:
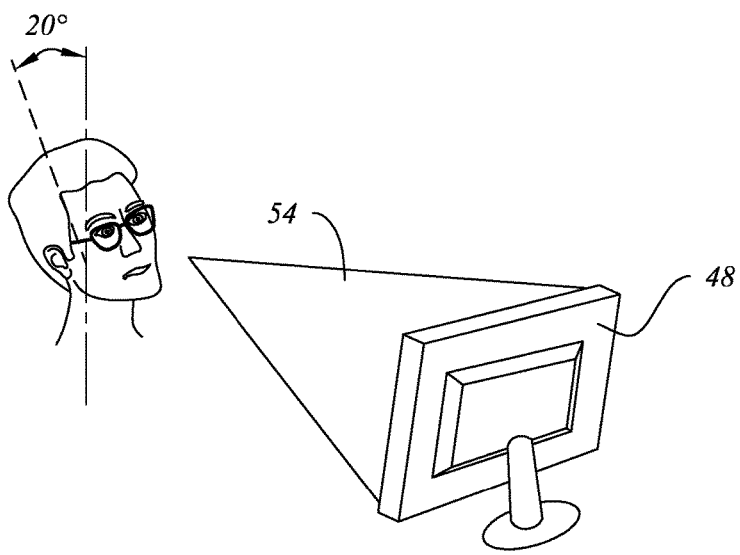
FIG. 12B shows typical field of vision locations for the eyeglass wearer of FIG. 12A when his head is tilted back to align the proper field of vision with the computer screen.
Figure 12C:
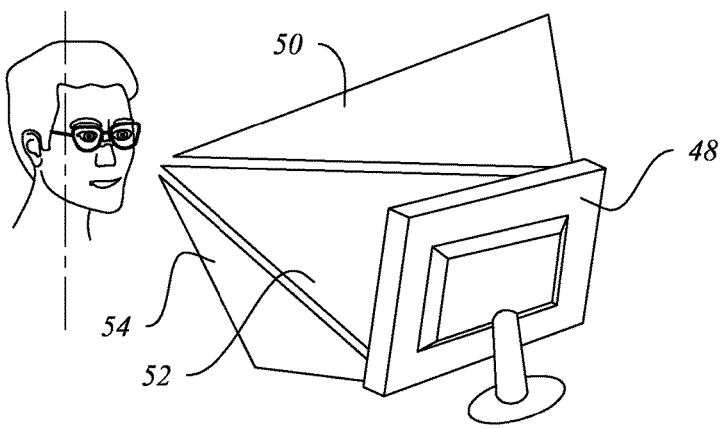
FIG. 12C shows typical field of vision locations for the eyeglass wearer of FIG. 12A using a preferred embodiment of the eyeglass positioning device of the invention with his head in a natural position.

To correct the placement of the field of vision, the user may tilt his or her head back, as shown in FIG. 12B, to bring the intermediate 52 or near 54 fields into the line of sight with screen 48. This can be uncomfortable and result in neck and shoulder pain and headaches. FIG. 12C shows the typical field of vision ranges when an eyeglass positioning device according to the invention is used when the user's head is in a normal head tilt position. The use of an eyeglass positioning device, such as device 10, raises the near 54 and intermediate 52 fields of vision so they are more in line with the screen 48.

Similarly, FIGS. 15A and 15B show a typical alignment of trifocal lenses with a user's eye 146. These representative eyeglass frames 148 are shown without the use of an eyeglass positioning device according to the invention (FIG. 15A) and with the use of an eyeglass positioning device 100 (discussed below with reference to FIGS. 13-14) according to an embodiment of the invention (FIG. 15B). The trifocal lenses have a distance field region 150, an intermediate field region 152, and a near field region 154. When no eyeglass positioning device is used (FIG. 15A), the distance field region 150 of the lenses is primarily aligned with the user's eye 146. When an eyeglass positioning device 100 is used, the intermediate field region 152 and near field region 154 are elevated relative to the user's eye 146, to bring those fields of vision into the user's line of sight.

The locations of the fields of vision in FIGS. 12A-12C and the elevation of lens regions in FIGS. 15A-15B are intended to be representative and not limiting, as they may vary depending on a variety of factors, such as the user's face dimensions (nose size, eye size, etc.), user's eyeglasses (frame shape, style, type of lenses, etc.), distance from the user to the object of focus (such as screen 48), and the particular embodiment of eyeglass positioning device used. Additionally, although shown and discussed with respect to the embodiments of FIGS. 1-7 and FIGS. 13-14, the same or similar results are achieved with other embodiments of eyeglass positioning devices according to the invention.

Once the user has an eyeglass positioning device, such as device 10 or 100 in place in an upright orientation (FIG. 8), if the desired focal region of the user's eyeglass lenses is not aligned with the object of focus, the user may try either adjusting the position of the device 10 on his or her nose (such as moving it up the nose toward the forehead or moving it down the nose toward the mouth) slightly and/or may try the alternate, inverted position. Use of the inverted position (FIGS. 10-11) simply requires the user to rotate device 10 so that connector 12 is located toward the mouth and support arms 14 extend up toward the eyes. Some placement adjustment may be necessary to achieve the desired results and the most comfortable position for the user, but there are no mechanical parts (such as the set screws in prior art devices) that require adjustment to allow flexibility in use of the positioning devices according to the invention. Additionally, the eyeglass positioning devices according to the invention do not hook onto or attach to the eyeglasses frame in any way, which has two benefits. First, it allows more flexibility in adjusting placement of the positioning device relative to the user's nose and the eyeglasses frame to achieve desired positioning of the field(s) of vision and desired comfort level. Second, it does not require the positioning device to be placed behind the bridge on the eyeglasses frame, between the bridge and the user's nose/forehead area. Many prior art devices do require such positioning to attach the device to the eyeglasses, which results in pushing the eyeglasses forward relative to the user's face. This forward displacement of the eyeglasses frame may cause discomfort where the temple ends contact the user's ears and may limit the field of corrected vision. The structure of the eyeglass positioning devices according to the preferred embodiments of the invention does not require a forward shift in the frames (although a user may optionally adjust his or her frames slightly forward on the positioning device, if desired).

Figure 13A:
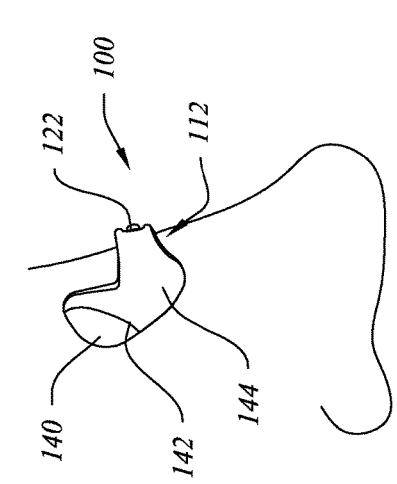
FIG. 13A shows a front perspective view of another preferred embodiment of an eyeglass positioning device according to the invention, when in place on a user's nose in an upright orientation.
Figure 14A:
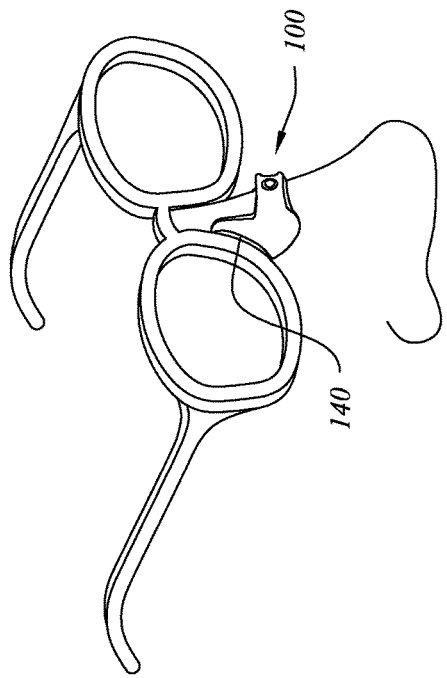
FIG. 14A shows the eyeglass positioning device of FIG. 13A with a representative pair of eyeglasses in place on the eyeglass positioning device.
Figure 13B:
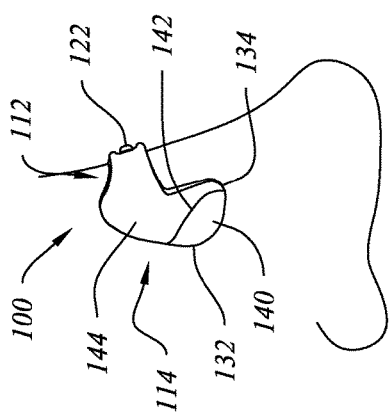
FIG. 13B shows the eyeglass positioning device of FIG. 13A when in place on a user's nose in an inverted position.
Figure 14B:
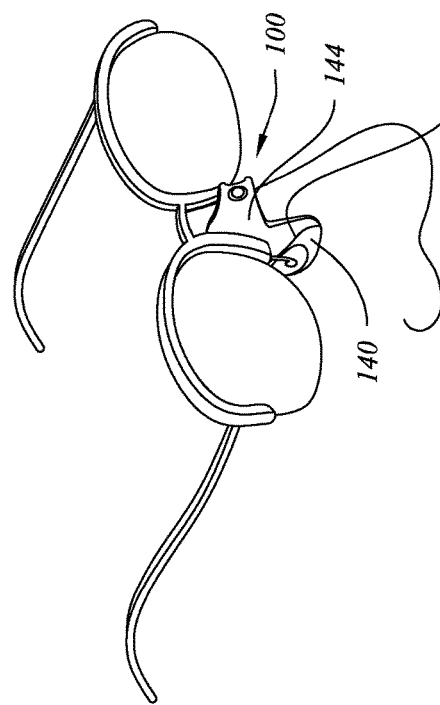
FIG. 14B shows the eyeglass positioning device of FIG. 13B with a representative paid of eyeglasses in place on the eyeglass positioning device.

Referring to FIGS. 13-14, another preferred embodiment of an eyeglass positioning device 100 according to the invention is shown. In this embodiment, eyeglass positioning device 100 preferably comprises a generally U-shaped connector 112 and two support arms 114 extending in a substantially perpendicular direction from each rearward end of the U-shaped connector 112. Connector 112 and support arms 114 are preferably unitarily molded as a single part. Positioning device 100 is similar to device 10, except that each support arm 114 of device 100 preferably comprises a raised area 144 and a recessed area 140 on an exterior surface, divided by a ridge 142. Most preferably, the recessed area 140 is disposed on an end of support arm 114 nearest rounded corners 132 and 134 and furthest from connector 112. The recessed areas 140 on each support arm provide a location for contact with a portion of an eyeglass frame that results in a smaller elevation of the frames, while the raised areas 144 on each support arm provide a location for contact with a portion of an eyeglass frame that results in greater elevation of the frames. These results are similar to the use of varying thicknesses discussed above with respect to device 10. The thickness of recessed area 140 is preferably between 1 and 3 mm and more preferably between 1 and 1.5 mm. Most preferably, the thickness of recessed area 140 is around 1.3 mm. The thickness of raised area 144 is preferably between 3 and 5 mm and more preferably between 3 and 4 mm. Most preferably, the thickness of raised area 144 is around 3.5 mm.

For eyeglass frames with a saddle bridge, which typically sit lower on the bridge of a user's nose, it may be better to use positioning device 100 in an inverted position (FIG. 13B) so that the saddle bridge rests on raised area 144. This point of contact may provide the best level of height adjustment for that particular style of frames. For eyeglass frames with nose pads, which typically are positioned slightly higher relative to the user's eyes than frames with a saddle bridge, it may be better to use positioning device 100 in an upright position (FIG. 14A) so that the nose pads fit into recessed areas 140 below ridge line 142. The use of the thinner, recessed areas 140 for the point of contact with nose pads may provide the best level of height adjustment for that particular style of frames. Again, use of positioning device 100 is not limited by the style, size, or type of frames and the use of one orientation over the other, and positioning the device and frames so that the point of contact is either raised area 144 or recessed area 140, may vary depending on the user and his or her particular eyeglasses and needs.

The inclusion of a ridge 142 to separate these differing areas of thickness 144, 140, as contrasted to a smooth transition between varying thicknesses with device 10, may provide a barrier to slippage with certain types of eyeglass frames. When placed in an inverted position (FIG. 13B), an eyeglasses frame that is positioned to contact recessed area 140 may have its forward edge or nose pads rest against ridge 142 to prevent slippage. For example, an eyeglass frame with a saddle bridge (FIG. 14B) may sit on recessed area 140 with a forward edge of the frame resting against each ridge 142 to aid in securing the eyeglass frame in place on positioning device 100 and prevent slippage of the frame.

Similarly a frame with nose pads may be positioned so that a forward edge of each nose pad engages with ridge 142.

Referring to FIG. 16, another preferred embodiment of an eyeglass positioning device 200 according to the invention is shown. In this embodiment, eyeglass positioning device 200 preferably comprises a connector 212 and two support arms 214 extending outwardly from connector 212. In this embodiment, device 200 also comprises a flexible wire 240 disposed within the bodies of connector 212 and arms 214. Prior to first use, device 200 is in a substantially flat configuration, with arms 214 being substantially inline with connector 212 (when viewed from a side elevation, although there may be some curvature as shown in the top plan view of FIG. 16, that positions support arms 214 in a slightly downward extending direction when device 200 is used in an upright orientation or slightly upward extending direction when used in an inverted direction). Wire 240 allows device 200 to be bent by the user or an eye doctor or eyeglass fitting professional to provide a more custom fit to the user's nose/face and particular eyeglasses frame. In this way, device 200 may be made so that the space (similar to space 16 for device 10) into which the user's nose is placed may be wider or more narrow, to best fit the nose size. Once bent, device 200 preferably is configured to hold the applied shape between uses, allowing the user to repeatedly use and remove device 200 without requiring reshaping or adjustment of the bend for each use. If desired, device 200 may be reshaped by applying sufficient force to wire 240 if an adjustment is needed; the force required is preferably small enough that a user can easily make the adjustments by hand or with simple hand tools but large enough that the forces typically applied when placing and removing device 200 for use will not cause an unintended change in shape. As an additional alternative, device 200 may be made of materials that may be heat-set, so that once a desired shape is achieved that shape may be locked-in by applying heat to device 200 (such as heat from a hair dryer).

Additionally, device 200 may optionally be configured to allow a portion of connector 212 or one or both arms 214 to be trimmed to reduce the overall size of device 200. Each arm preferably has a rounded end 234 and a rounded end 232. Ends 232 may be a differing thickness compared to ends 234 and of the same or differing shapes (symmetrical or asymmetrical). Device 200 is positionable in an upright orientation or inverted orientation as with devices 10 and 100. When differing thicknesses are used with ends 232 and 234, this allows either a thicker end or a thinner end to be positioned higher on the user's nose, allowing greater flexibility in fitting device 200 to the user's face and eyeglasses frames. The shape of arms 214 are representative and other shapes, including the shapes for arms 314 shown in FIG. 17B and FIG. 18, may also be used.

Referring to FIGS. 17-20, another preferred embodiment of an eyeglass positioning device 300 is shown. Eyeglass positioning device 300 preferably comprises a connector 312 and two support arms 314, which are separate parts that are connectable together. Connector 312 is preferably generally U-shaped, with a central portion 330 that forms the rounded part of the U-shape and extending out to ends 333. Central portion 330 may be shaped similarly to central portion 30 or may have a different shape. A post 340 preferably extends outwardly from each end 333. Posts 340 are configured to mate with corresponding receptacles or slots 342 in support arms 314 to allow the arms 314 to be securely attached to connector 312. Posts 340 may be configured to mate with slots 342 by pressure fitting, frictional engagement, threaded engagement, adhesives, or other methods of attachment. Most preferably, some form of adhesive is used to secure posts 340 into slots 342. Posts 340 may optionally have a barbed end 344 (shown in dotted lines in FIG. 17A) that is configured to engage with a corresponding recess 346 on slot 342 (see FIGS. 18 and 20). Barbed end 344 and recess 346 may aid in ensuring arms 314 do not become disconnected from connector 312 during use. Posts 340 preferably are disposed at least partially into connector 312 to aid in securing posts to connector 312. Posts 340, or a separate piece of wire, may extend all the way through or partially through a length of connector 312 to allow connector 312 to be bent into a narrower or wider shape, similar to device 200.

FIGS. 17B-19 show alternate embodiments of support arm shapes and configurations, 314A-314D. For example, support arm 314A is substantially circular in shape with a flattened end through which slot 342 is disposed. Support arm 314B is substantially oval in shape with an end that is slightly angled relative to other parts of arm 314B. Support arm 314B results in an arm that is closer to a perpendicular orientation relative to connector 312, similar to arms 14 and connector 12. Slot 342 is disposed through the slightly angled end of arm 314B. Support arm 314C is an elongated oval shape with a flattened end through which slot 342 is disposed. Support arm 314D is a heart shape with a flattened end through which slot 342 is disposed. Support arm 314D has rounded ends 334 and 332, which may be of differing thicknesses (similar to rounded ends 234 and 232 for support arm 214) as shown in FIG. 19. Other shapes, sizes, and configurations may be used for support arms and any combination of support arms may be used with device 300. Support arms 314 may be configured to have any variety of angular positions relative to connector 312. Most preferably a plurality of interchangeable pairs of support arms are provided for use with device 300, each pair having a different set of size and shape characteristics (including overall shape, as well as, differing lengths, widths, angles, and thicknesses for various parts).

Figure 20:
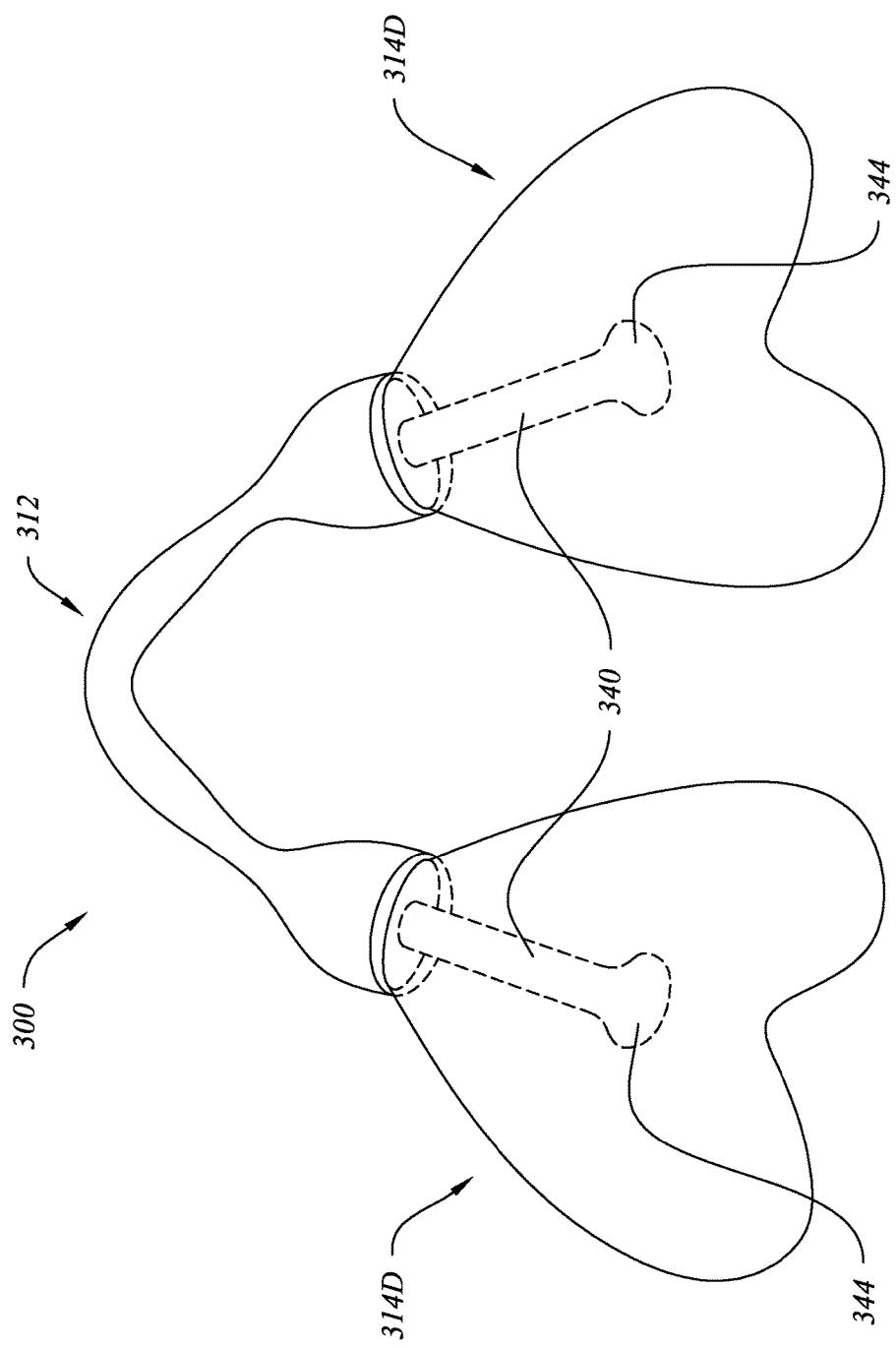
FIG. 20 shows a front elevation view of the connector of FIG. 17A with two support arms of FIG. 18, with the support arms shown in a rotated position for ease of viewing.

FIG. 20 shows one embodiment of device 300, using support the support arm configuration of 314D. In actual use, support arms 314D would be rotated relative to connector 312 substantially 90° from the orientation shown in FIG. 20, but this position in shown in FIG. 20 for ease of viewing. Additionally, posts 340 may not be visible from the exterior of device 300, depending on the material used and coloration, but are shown in FIG. 20 in dotted fines for ease of reference. Although it is preferred to use two support arms of the same configuration (a pair having one set of size and shape characteristics) so that the right and left sides of the eyeglasses are elevated to the same level, differing configurations (an arm having one set of size and shape characteristics and a second arm having a differing set of size and shape characteristics) may also be used if desired to provide a better fit for a user's nose/face or eyeglasses frames (particularly if the eyeglasses frames are out of adjustment).

Device 300 is also usable in an upright orientation or an inverted orientation by merely rotating the device, as with device 10. Depending on the shape of connector 312, this rotation may cause device 300 to fit slightly differently in one orientation compared to the other with respect to the location of connector 312 on the nose. If an end (e.g. 332) of each arm is thinner than another end (e.g. 334), the user may selectively position the thinner or thicker end in a location on the side of the nose that will contact the eyeglass frame to either decrease or increase the level of elevation by selecting one orientation or the other. Posts 340 are most preferably configured so that arms 314 do not rotate once posts 340 are inserted into and engaged with slots 342, but these components may alternatively be configured to allow arms 314 to rotate about posts 340, while still staying connected to connector 312. Rotating the arms 314 may be useful when one end (e.g. 332) of each arm is thinner than another end (e.g. 334), to selectively position the arms relative to the eyeglass frame to either decrease or increase the level of elevation, without moving the position of connector 312 relative to the nose. This achieves additional variation in orientation of the device.

Connector 312 and support arms 314 may be made of the same material or different materials to achieve different results. For example, connector 312 may be more rigid or spring-like to gently press support arms 314 into the sides of the nose to aid in holding device 300 in position, without applying too much pressure or pinching the nose. Support arms 314 may be made of a gel filled pocket or spongy silicone or other cushioning materials to provide additional padding. Although any embodiment of an eyeglass positioning device according to the invention may generally be used with any style, size, or shape of eyeglasses frames, the use of a variety of differing inter-connectable component shapes with device 300 provides even greater flexibility in customizing an eyeglass positioning device for a particular user and the user's nose/face.

Positioning devices 10, 100, 200, and 300 are preferably configured with enough structural rigidity (after initial bending/shaping with respect to device 200) to retain their shape (with nose area 16, for example, remaining intact) when the device is removed from the nose. As an additional alternative, which may further decrease the costs of manufacturing and make single use or short term use applications even more feasible, another eyeglass positioning device may be formed from a flexible material, such as vinyl or foam, that has a substantially flat configuration prior to use (similar to device 200 prior to bending, but without wire 240) and is capable of substantially forming to the shape of a user's nose during use and then returning to a flat configuration when removed. In this embodiment, one surface comprises an adhesive material with a removable backing. In use, the backing is removed and the adhesive side is placed on the user's nose. In the other embodiments, the structural rigidity aids in holding the device in place on a user's nose (along with preferred non-slip surface materials), but adhesives are not required. Because this embodiment does not have any structural rigidity, an adhesive is preferably used to hold the device in position on the user's nose, although with certain non-slip surface materials it may be possible to hold this embodiment in place without an adhesive. As with other adhesives that may contact the user's nose described herein, it is preferably low-tack. The size, thickness, and variety of arm shapes described for the other embodiments may also be used with this embodiment.

To increase cushioning and/or to increase the level of elevation, a plurality of attachable pads may be used with any embodiment of eyeglass positioning devices according to the invention. At least one such pad preferably comprises a non-adhesive side and self-adhesive side having a removable backing to protect the adhesive prior to use. The self-adhesive side may be adhered to either the inside surface the positioning device (so the non-adhesive side is in contact with the user's nose, either along the top of the nose or the sides) or the outside of the positioning device in an area where the eyeglass frame contacts the positioning device (so the non-adhesive side contacts the frame). The positioning device may include indicia, such as an outline matching the shape of the pads, to aid in placing the pads on the positioning device. If recess area 26 is included, it may also be used to aid in placement of one or more pads. Multiple pads may be used in multiple and various areas of the positioning devices, such as a pad on each side of the nose on an interior of each support arm 14 and a pad along the top of the nose on the interior of connector 12. Additional pads may be stacked on these pads to further increase comfort or the level of elevation as desired. Alternatively, both sides of the pads may be self-adhesive when used on the interior of the positioning device to aid in securing the device to the user's nose. The self-adhesive side that contacts the nose is preferably low-tack, so the pads may be easily removed without hurting the user or leaving residue. The pads are also preferable disposable and replaceable with new pads should they become worn, dirty, or lose tackiness. Each pad is most preferably around 1 mm in thickness and round or oval in shape, similar to nose pads on eyeglass frames, but other sizes and shapes may be used. Additionally, the positioning device may include a plurality of pads of varying sizes and thickness, to provide any greater flexibility in achieving the desired level of comfort and elevation based on the user's nose/face shape/size and the particular eyeglass frames. Although self-sticking pads are preferred, adhesives may also be used with pads that do not have self-stick adhesive already applied or in addition to the self-stick adhesive.

All of the embodiments of eyeglass positioning devices according to the invention are lightweight, preferably weighing between 0.5 g and 1.0 g and most preferably no more than 0.7 gram. The devices according to the invention are configured for single use (disposable and replaceable with a new device), short term use (useable several times prior to disposal and replacement with a new device), or long term use (useable for several weeks or months). The positioning devices are easily used and removed, without requiring any alteration of the eyeglass frames and will not leave any marks or residue on the frames or lenses. The positioning devices also do not obstruct the field of view through the lenses, like some prior art devices do.

The features and optional components of any eyeglass positioning device described herein, such as optional indentations 26, materials for manufacture, sizes, adjustment wire 240, trimmable material, visual/tactile indicators, etc. may be used with any of the embodiments (e.g. 10, 100, 200, or 300) even if not specifically described herein with that particular embodiment. Most preferably, the positioning devices according to the invention are configured to maintain their position on the user's nose during normal use, even if no adhesive is used on the interior surface, so that the user can make typical head movements (such as nodding or looking down) without the positioning device moving on the nose.

Although the positioning devices according to the invention may come in a variety of sizes, such as small, medium, and large to better fit different face sizes, the positioning devices are fairly universal for use with all eyeglass frames and do not require the use of specially designed eyeglass frames or limited styles, sizes and shapes of eyeglass frames. The devices include various components, configurations, and orientations that allow for an adjustable fit to suit the user's face and the user's particular eyeglass frame.

References herein to elevated, raised, and the like refer to a direction from the user's chin toward the forehead and references to lowered and the like referring to an opposite direction. References herein to forward or the like refer to a direction from the back of the user's head toward the face and references to rearward and the like refer to an opposite direction. References herein to thickness refer to the dimension of the device or component of the device from the interior surface out toward the exterior surface, in a direction that would be substantially perpendicular to the point of contact with the user's nose. References herein to the sides of user's nose refer to the upper lateral cartilage area where arms 14 are located in FIGS. 8 and 10. References herein to the top or bridge of the nose refer to the nasal bone and septal cartilage areas near where protrusion 22 is located in FIGS. 8 and 10. Those of ordinary skill in the art will also appreciate upon reading this specification and the description of preferred embodiments herein that modifications and alterations to the devices may be made within the scope of the invention and it is intended that the scope of the invention disclosed herein be limited only by the broadest interpretation of the appended claims to which the inventors are legally entitled.

We claim:

1. An eyeglass positioning device configured to position eyeglasses to elevate a preferred viewing area of multifocal eyeglass lenses relative to a user's eyes, the positioning device comprising:
    a connector configured to extend across a top portion of the user's nose, the connector having a first length longitudinally;
    a first support arm extending from a first end of the connector and configured to engage with a first side of the user's nose;
    a second support arm extending from a second end of the connector and configured to engage with a second side of the user's nose;
    wherein the positioning device is configured so that the eyeglasses rest upon the connector, the support arms, or both without any portion of the eyeglasses being attached to the positioning device such that when the eyeglasses are removed from the user's face the positioning device is not removed with the eyeglasses;
    wherein each support arm has a second length longitudinally;
    wherein longitudinally is in a direction extending between the user's forehead and mouth; and
    wherein the first length is shorter than the second length.

2. The eyeglass positioning device of claim 1 wherein each support arm comprises a first portion disposed proximal to the connector and a second portion disposed distal to the connector, wherein the first portion and second portions are of differing thicknesses.

3. The eyeglass positioning device of claim 2 further comprising a ridge dividing the first portion and second portion on each support arm and wherein the ridge is configured to prevent movement of the eyeglasses down the user's nose.

4. The eyeglass positioning device of claim 1 wherein the device may be selectively oriented in an upright or inverted position; wherein the connector is positioned proximal to the eyes and the support arms extend along the sides of the nose toward the user's mouth when the device is in an upright position and the connector is positioned distal to the eyes and the support arms extend along the sides of the nose toward the user's eyes when the device is in the inverted position.

5. The eyeglass positioning device of claim 1 further comprising a tactile or visual alignment indicator disposed on a forward facing surface of the positioning device.

6. The eyeglass positioning device of claim 5 wherein the indicator comprises a recess or protrusion disposed in a central portion of the forward facing surface of the connector.

7. The eyeglass positioning device of claim 6 wherein the recess or protrusion is colored differently from a color of the connector.

8. The eyeglass positioning device of claim 1 wherein the device is made of transparent or semi-transparent material.

9. The eyeglass positioning device of claim 1 wherein the device is made of material colored in a flesh-tone color.

10. The eyeglass positioning device of claim 1 further comprising a wire disposed inside the connector and supports arms to allow the device to be shaped to a user's nose.

11. The eyeglass positioning device of claim 1 wherein the connector and support arms are unitarily molded.

12. An eyeglass positioning device configured to position eyeglasses to elevate a preferred viewing area of multifocal eyeglass lenses relative to a user's eyes, the positioning device comprising:
    a connector configured to extend across a top portion of the user's nose;
    a first support arm extending from a first end of the connector and configured to engage with a first side of the user's nose;
    a second support arm extending from a second end of the connector and configured to engage with a second side of the user's nose;
    wherein the positioning device is configured so that the eyeglasses rest upon the connector, the support arms, or both without any portion of the eyeglasses being attached to the positioning device such that when the eyeglasses are removed from the user's face the positioning device is not removed with the eyeglasses; and
    wherein the connector and first and second support arms are separate components that are attachable together.

13. The eyeglass positioning device of claim 12 wherein the connector comprises a first post extending outwardly from the first end and a second post extending outwardly from the second end;
    wherein the first support arm comprises a first slot configured to receive the first post;
    wherein the second support arm comprises a second slot configured to receive the second post.

14. The eyeglass positioning device of 13 wherein an end of each post distal to the connector comprises a barb and each slot comprises a recess configured to mate with the barb.

15. The eyeglass positioning device of claim 13 wherein each support arm is rotatable around the post.

16. The eyeglass positioning device of claim 12 further comprising a plurality of interchangeable pairs of support arms, wherein the first and second support arms have a first set of size and shape characteristics and each additional pair of support arms has a different set of size and shape characteristics, such that different pairs of support arms may be attached to the connector to alter the configuration of the positioning device.

17. The eyeglass positioning device of claim 1 wherein an interior surface or exterior surface or both of one or more of the connector, first support arm or second support arm is made from slip-resistant material.

18. The eyeglass positioning device of claim 1 wherein an interior surface of one or more of the connector, first support arm or second support arm comprises an adhesive to aid in securing the device to the user's nose.

19. The eyeglass positioning device of claim 18 wherein the adhesive is a low-tack adhesive that does not leave a residue on the user's nose when the device is removed.

20. The eyeglass positioning device of claim 1 further comprising one or more removable pads, wherein each pad comprises a non-adhesive surface and an adhesive surface substantially opposite the non-adhesive surface, wherein each pad is configured to be selectively positioned on any portion of an interior surface or exterior surface of the device to increase comfort or increase the level of elevation of the lenses.

21. The eyeglass positioning device of claim 20 wherein the pads are configured to be stacked together to further increase comfort or increase the level of elevation of the lenses.

22. The eyeglass positioning device of claim 1 wherein an interior surface of each support arm comprises a recessed area configured to provide a cupping or slight suction against the user's nose.

23. The eyeglass positioning device of claim 1 wherein the device retains its shape when not in position on a user's nose.

24. An eyeglass positioning device configured to position eyeglasses to elevate a preferred viewing area of multifocal eyeglass lenses relative to a user's eyes, the positioning device comprising:
    a connector configured to extend across a top portion of the user's nose;
    a first support arm extending from a first end of the connector and configured to engage with a first side of the user's nose;
    a second support arm extending from a second end of the connector and configured to engage with a second side of the user's nose;
    wherein the positioning device is configured so that the eyeglasses rest upon the connector, the support arms, or both without any portion of the eyeglasses being attached to the positioning device such that when the eyeglasses are removed from the user's face the positioning device is not removed with the eyeglasses; and
    wherein the connector does not extend between a bridge on the eyeglass frame and the user's nose or forehead.

25. The eyeglass positioning device of claim 1 wherein the device does not obstruct a field of view through the lenses.

26. The eyeglass positioning device of claim 1 wherein one or more of the connector, first support arm, and second support arm are configured to facilitate trimming by the user to selectively modify an area in contact with the nose or the eyeglasses frame.

27. The eyeglass positioning device of claim 1 wherein the positioning device and eyeglasses are independently positionable relative to each other and the user's nose.

28. The eyeglass positioning device of claim 1 wherein the positioning device and eyeglasses are selectively positionable relative to each other.

29. The eyeglass positioning device of claim 1 wherein the positioning device is not mechanically affixed to the eyeglass frame and is configured so that it does not hook onto or grasp a forward facing surface and a rear facing surface of the eyeglass frame or lenses.

30. An eyeglass positioning device configured to position eyeglasses to elevate a preferred viewing area of multifocal eyeglass lenses relative to a user's eyes, the positioning device comprising:
    a substantially u-shaped connector configured to extend across a top portion of the user's nose, the connector having a bottom face, a top face, a first end, a second end, and a central portion disposed laterally between the first and second ends and longitudinally between the top and bottom faces;
    a first support arm extending longitudinally from a first end of the connector and configured to engage with a first side of the user's nose;
    a second support arm extending longitudinally from a second end of the connector and configured to engage with a second side of the user's nose;
    wherein the positioning device is configured so that nose pads or a frame for the eyeglasses are selectively positionable to rest upon any portion of the connector, any portion of the support arms, or both;
    wherein each support arm has a forward facing edge, a rearward facing edge, and a connecting edge disposed between the forward facing edge and rearward facing edge at an end of the arm distal from the connector;
    wherein the forward facing edge of each support arm is disposed at an angle between 45°-135° relative to the bottom face of the connector; and
    wherein laterally is in a direction extending between the user's ears and longitudinally is in a direction extending between the user's forehead and mouth.

31. The eyeglass positioning device of claim 30 wherein the positioning device may be selectively oriented in an upright or inverted position; wherein the connector is positioned proximal to the eyes with the bottom face closer to the user's mouth and the support arms extend along the sides of the nose toward the user's mouth when the device is in an upright position and the connector is positioned distal to the eyes with the bottom face closer to the user's eyes and the support arms extend along the sides of the nose toward the user's eyes when the device is in the inverted position.

32. The eyeglass positioning device of claim 30 wherein the positioning device and eyeglasses are independently positionable relative to each other and the user's nose.

33. They eyeglass positioning device of claim 30 wherein an exterior surface of the positioning device frictionally engages the nose pads on the eyeglass frame or a lateral surface of the eyeglass frame disposed between a forward facing surface and a rearward facing surface of the eyeglass frame and wherein such frictional engagement is the sole means of securing the eyeglasses to the positioning device.

34. The eyeglass positioning device of claim 31 further comprising a ridge on each support arm;
    wherein each support arm comprises a first portion disposed proximal to the connector and a second portion disposed distal to the connector, wherein the first portion and second portions are of differing thicknesses;
    wherein the ridge divides the first portion and second portion on each support arm; and
    wherein the ridge is configured to engage with a forward facing surface of eyeglass frame to aid in securing the eyeglasses eyeglass frame to the positioning device when the positioning device is in an inverted position.

35. The eyeglass positioning device of claim 1 wherein one or more of the connector, first support arm, second support arm, or a combination thereof has a first portion having a first thickness and one or more of the connector, first support arm, second support arm, or a combination thereof has a second portion having a second thickness that differs from the first thickness;
    wherein the first and second thicknesses are measured in a direction from an interior surface of the positioning device near the nose to an exterior surface of the position device away from the nose; and wherein the eyeglasses may be placed to rest upon the first portion or the second portion to increase or decrease a level of elevation of the preferred viewing area of the multi-focal lenses relative to the user's eyes.

36. An eyeglass positioning device configured to position eyeglasses to elevate a preferred viewing area of multifocal eyeglass lenses relative to a user's eyes, the positioning device comprising:

a substantially u-shaped connector configured to extend across a top portion of the user's nose, the connector having a bottom face, a top face, a first end, a second end, and a central portion disposed laterally between the first and second ends and longitudinally between the bottom and top faces;

a first support arm extending longitudinally from the first end of the connector in a substantially perpendicular direction and configured to engage with a first side of the user's nose;

a second support arm extending longitudinally from the second end of the connector in a substantially perpendicular direction and configured to engage with a second side of the user's nose;

wherein the positioning device is configured so that the eyeglasses rest upon the connector, the support arms, or both without any portion of the eyeglasses being attached or connected to the positioning device, such that when the eyeglasses are removed from the user's face the positioning device remains in place on the user's nose; and wherein laterally is in a direction extending between the user's ears and longitudinally is in a direction extending between the user's forehead and mouth.

37. The eyeglass positioning device of claim 36 wherein each support arm has a forward facing edge, a rearward facing edge, and a connecting edge disposed between the forward facing edge and rearward facing edge at an end of the arm distal from the connector; and wherein the forward facing edge of each support arm is disposed at an angle between 85°-95° relative to the bottom face of the connector.

38. The eyeglass positioning device of claim 1 wherein the connector is substantially u-shaped, having a bottom face, a top face, a first end, a second end, and a central portion disposed laterally between the first and second ends and longitudinally between the top and bottom faces;

wherein each support arm has a forward facing edge, a rearward facing edge, and a connecting edge disposed between the forward facing edge and rearward facing edge at an end of the arm distal from the connector;

wherein the forward facing edge of each support arm is disposed at an angle between 45°-135° relative to the bottom face of the connector.

39. The eyeglass positioning device of claim 38 wherein the forward facing edge of each support arm is disposed at an angle between 85°-95° relative to the bottom face of the connector.

40. The eyeglass positioning device of claim 38 wherein the rearward facing edge of each support arm is disposed at an angle between 50°-70° relative to the bottom face of the connector.

41. The eyeglass positioning device of claim 40 wherein the connecting edge of each support arm is disposed at an angle between 30°-50° relative to the bottom face of the connector.

42. The eyeglass positioning device of claim 30 wherein the forward facing edge of each support arm is disposed at an angle between 85°-95° relative to the bottom face of the connector.

43. The eyeglass positioning device of claim 30 wherein the rearward facing edge of each support arm is disposed at an angle between 50°-70° relative to the bottom face of the connector.

44. The eyeglass positioning device of claim 43 wherein the connecting edge of each support arm is disposed at an angle between 30°-50° relative to the bottom face of the connector.

* * * * *